United States Patent [19]

Greenhill et al.

[11] Patent Number: 5,639,074
[45] Date of Patent: Jun. 17, 1997

[54] INTERLACED WAVE SPRING

[75] Inventors: Michael Greenhill, Highland Park; David Maxwell, Fox River Grove, both of Ill.

[73] Assignee: Smalley Steel Ring Co., Wheeling, Ill.

[21] Appl. No.: 611,055

[22] Filed: Mar. 5, 1996

[51] Int. Cl.[6] ........................................ F16F 1/06
[52] U.S. Cl. ............................ 267/162; 267/158
[58] Field of Search ........................ 267/166, 182, 267/161, 162, 180, 158, 181, 148, 149, 168, 167; 411/521, 545; 403/326

[56] References Cited

U.S. PATENT DOCUMENTS

| | | |
|---|---|---|
| 99,475 | 2/1870 | Rhinelander . |
| 101,724 | 4/1870 | French . |
| 361,298 | 4/1887 | Kilmer . |
| 596,079 | 12/1897 | Morse . |
| 1,139,732 | 5/1915 | Slick . |
| 1,523,225 | 1/1925 | Lukens . |
| 2,982,323 | 5/1961 | Vossloh et al. . |
| 2,985,054 | 5/1961 | Bramberry et al. . |
| 3,021,129 | 2/1962 | Maker . |
| 3,319,508 | 5/1967 | McCormick . |
| 3,535,977 | 10/1970 | Baumgarten . |
| 3,674,251 | 7/1972 | Tirabassi ........................ 267/162 |
| 3,727,901 | 4/1973 | Textrom . |
| 3,880,414 | 4/1975 | Smith et al. . |
| 3,905,403 | 9/1975 | Smith et al. . |
| 4,405,251 | 9/1983 | Kolchinsky et al. . |
| 4,752,178 | 6/1988 | Greenhill . |
| 4,821,390 | 4/1989 | Seyler . |
| 4,889,327 | 12/1989 | Seyler . |
| 4,901,987 | 2/1990 | Greenhill et al. . |
| 5,558,393 | 9/1996 | Hawkins et al. ................ 267/162 |

FOREIGN PATENT DOCUMENTS

| | | |
|---|---|---|
| 2916446 | 6/1980 | Germany . |
| 3531200 | 5/1986 | Germany . |
| 663256 | 11/1987 | Switzerland . |

OTHER PUBLICATIONS

"Engineering Design Data and Applications for Edgewood Processed Wave Springs", *SmallTALK*, No. 1—1984 (2 Pages).

Smalley Steel Ring Copany 1984 Catalog "Spiral Retaining Rings & Wave Springs" (p. 31).

Smalley Steel Ring Company "Engineering and Parts Catalog, 1993".

*Primary Examiner*—Douglas C. Butler
*Attorney, Agent, or Firm*—Lockwood, Alex, Fitzgibbon & Cummings

[57] ABSTRACT

An interlaced wave spring is formed from two constituent wave springs of similar thickness, amplitude and frequency. The two constituent wave springs are combined together by interlacing them so that the spring turns of each spring abut each other for substantially the entire length of the interlaced spring. This interlacing effectively increases the thickness of the spring turns of the interlaced spring to thereby provide increased loading and greater fatigue resistance characteristics.

20 Claims, 2 Drawing Sheets

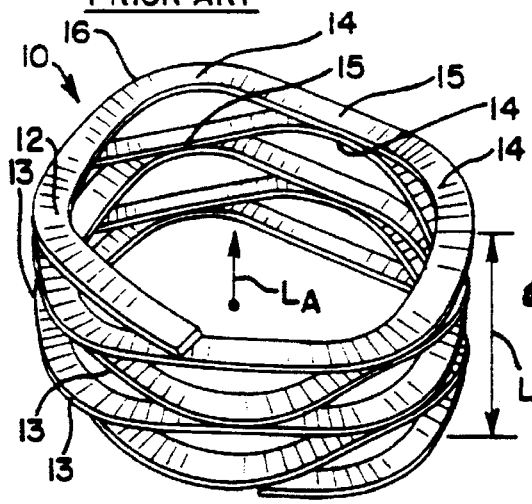
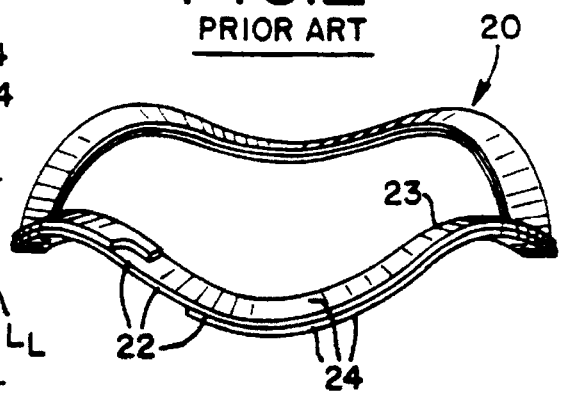
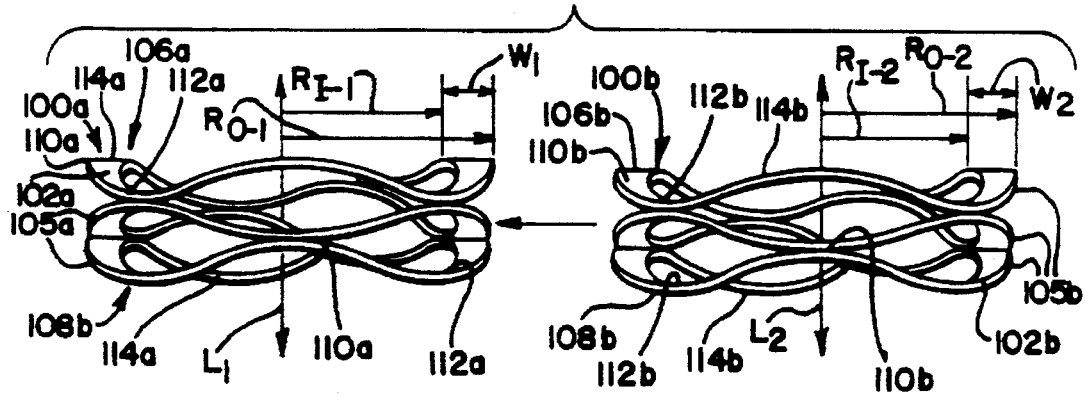
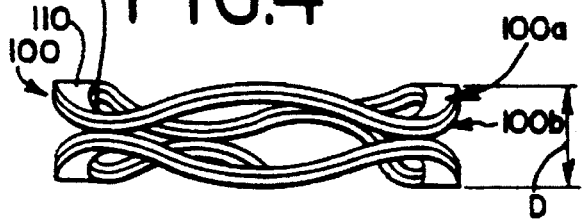
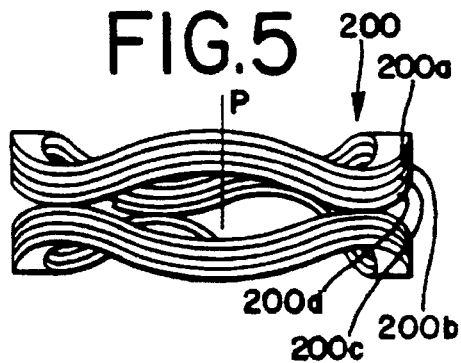

INTERLACED WAVE SPRING

Background And Summary Of The Present Invention

The present invention relates generally to wave springs, and more particularly to an interlaced wave spring having improved fatigue and operating characteristics.

Springs are used in a variety of mechanical applications. Numerous types of springs are known in the art and each type has certain advantages and disadvantages which affect the use of the spring. Examples of known springs are coil springs, disc springs, Belleville springs, wave washers and wave springs.

The coil spring is perhaps the best known type of spring. Coil springs are typically made from round wire by coiling wire around a mandrel at a helical pitch for a specific number of turns to provide a spring with a particular length. The ends of such springs may be finished with hook ends, for example, so that the spring may be engaged between two members. The ends may also be ground flat to provide end bearing surfaces when the spring is used in compression applications. Coil springs may be made in any length and for the most part, with any diameter of wire and are suitable for light and heavy-duty applications. An example of a heavy-duty coil spring is described in U.S. Pat. No. 1,523,225, issued Jan. 13, 1925.

Belleville washers are another type of spring and are typically stamped from sheet metal. A Belleville washer acts like a spring because it is conical in shape and has an inherent flexibility due to the conical shape. Such washers may be used in a variety of light to medium duty applications. They are expensive to produce and require special tooling and also have a tendency to invert when overloaded so their deflection characteristics change. Such a spring washer is described in U.S. Pat. No. 3,319,508, issued May 16, 1967.

Disc springs are similar to Belleville washers and are also stamped out of a sheet or strip of metal. They are expensive to produce because they require special tooling. They may be used for heavy-duty applications where they must resist and support large loads. However, when overloaded, the deflection characteristics of these springs are different from that of compression coil springs because, when overloaded disc springs have a tendency to invert and collapse.

Wave washers are also similar to Belleville washers in that they are stamped from sheet metal, but with a wave pattern formed in them. These type of washers include only a single turn. The wave pattern provides the operating length for the spring and provides a means for the washer to support loads.

The wave pattern used for wave washers has also been used in wave springs such as that described in U.S. Pat. No. 4,752,178 issued Jun. 21, 1988, which is assigned to the assignee of the present invention. As shown in this patent, a wave spring which is particularly suitable for use in retaining ring-type applications, includes one or more flat wire turns which are circularly wound and waved in a sinusoidal pattern to provide a wave spring having a predesired thickness which thickness is defined by the total number of spring turns of the spring.

The wave pattern has also been incorporated into springs wherein the spring turns have a sinusoidal shape. These type of wave springs are described in the art as "crest-to-crest" wave springs because the individual spring turns are oriented in a manner so that successive crest portions of one spring turn abut successive trough portions of each adjacent spring turn. Wave springs provide certain advantages over coil springs, primarily in terms of space-savings, because the wave spring provides the same load deflection characteristics as a coil spring but in a shorter length. Also, more precise spring loading is obtained with the use of wave springs because of their uniform waved structure.

Wave springs may be made in many different styles and shapes. The crest-to-crest wave spring described above may be modified to include opposing, flat end portions which are usually formed by gradually reducing the amplitude and frequency of the waves in the spring turns down to a constant zero level to form opposing flat shim end portions. Such a construction is aptly described in U.S. Pat. No. 4,901,987, issued Feb. 20, 1990, which patent is also owned by the assignee of the present invention.

Although useful for most applications, wave springs, like coil springs may be subject to fatigue during long cycles of loading and unloading as well as repeatedly changing loads. Fatigue may affect the usefulness of wave springs in a detrimental manner because after repeated cycles of even or uneven loading, the operating stress within the spring may increase to a level at which the metal of the spring undergoes failure. One solution to fatigue is to increase the size of the spring cross-section undergoing the loading to reduce the stress created in it under load. In the spring art, this requires using a heavier and larger wire or flat wire to form the spring. This solution is not always practical.

The present invention is therefore directed to an improved, interlaced wave spring which avoids the aforementioned shortcomings and develops new and improved performance characteristics not previously obtainable with crest-to-crest wave springs having a single thickness.

In a wave spring incorporating the principles of the present invention, multiple constituent wave springs are interlaced, or interwound, together in order to effectively increase the thickness of each of the spring turns, while maintaining the spring turns in their crest-to-crest orientation and without increasing the base size of the wire used to form the spring. This interlacing results in either a reduction of the operating stress of the spring thereby increasing the fatigue life of the spring, or maintaining the operating stress of the spring while increasing the spring load. These operational parameters, and others, are affected proportionally by the number of constituent springs which make up the interlaced spring.

In an interlaced wave spring incorporating the principles of the present invention, a plurality of constituent, multiple turn crest-to-crest wave springs are combined together to form a single spring. The constituent springs are formed with equal wave patterns in which the waves have substantially the same amplitudes and frequencies so that when they are interlaced, they act together under loading as a single spring. The constituent springs may be interlaced together. When the springs are interlaced together, they are aligned so that the successive crest and trough portions of adjacent spring turns "match up" and interfit together. In one preferred embodiment of the present invention, the successive crest and trough portions of adjacent spring turns generally share the same common centerpoint. When interlaced, the wave spring's operating parameters are increased or decreased by the number of interlaced springs.

Accordingly, it is a general object of the present invention to provide a new and improved wave spring with increased beneficial spring characteristics.

It is another object of the present invention to provide a multiturn crest-to-crest compression spring with multiple, interlaced springs.

It is a further object of the present invention to provide an interlaced, crest-to-crest wave spring in which the interlacings have substantially identical wave amplitudes and frequencies.

It is still yet a further object of the present invention to provide an improved crest-to-crest wave spring which includes a plurality of crest-to-crest wave springs interlaced together such that each spring turn abuts another spring turn and whereby the crests and troughs of the waves of adjacent interlacings lie substantially adjacent to each other, thereby decreasing the operating stress in the interlaced spring.

It is still yet another object of the present invention to provide an interlaced crest-to-crest wave spring which provides the benefits normally obtained from either nesting a plurality of single-turn wave springs together or stacking a series of crest-to-crest wave springs together in series wherein the interlaced spring is formed from a plurality of flat wire strips, each of the strips being edgewound about a common edge and a longitudinal axis of the interlaced spring to define multiple wave springs, each having a plurality of spring turns, each spring turn having successive, distinct wave crest and trough portions arranged in generally sinusoidal wavepaths so that the crests portions abut the trough portions of adjacent spring turns, the plurality of springs being interlaced together such that the flat wire strips lie adjacent each other and abut each other for the length of the spring, thereby effectively increasing the thickness of the spring by the number of individual springs interwound together.

These and other objects, features and advantages of the present invention will be clearly understood through a consideration of the following detailed description.

BRIEF DESCRIPTION OF THE DRAWINGS

In the course of this detailed description, reference will be made to the attached drawings wherein like reference numerals refer to like parts and in which:

FIG. 1 is a perspective view of a conventional multiple-turn wave spring;

FIG. 2 is a perspective view of a waved retaining ring in which the spring turns lie adjacent each other;

FIG. 3 is an elevational view of the manner of construction of interlaced crest-to-crest wave springs according to the present invention;

FIG. 4 is an elevational view of an interlaced wave spring constructed in accordance with the principles of the present invention illustrating an interlaced crest-to-crest wave spring having two interlacings;

FIG. 5 is an elevational view of an interlaced wave spring constructed in accordance with the principles of the present invention illustrating a crest-to-crest wave spring having four interlacings;

DETAILED DESCRIPTION OF THE INVENTION

Figure 6:
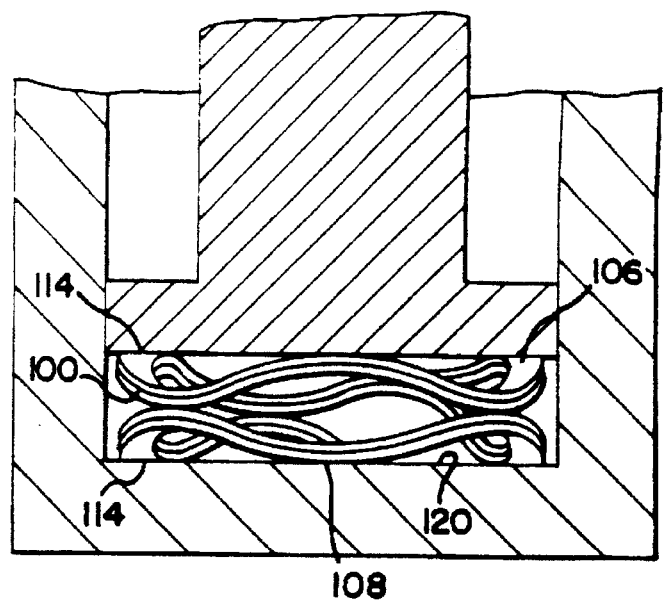
FIG. 6 is a sectional view of an interlaced crest- to-crest wave spring of the present invention assembled in a cylindrical bore.

FIG. 1 illustrates a conventional crest-to-crest wave spring 10 in which the spring 10 consists of a single strip of flat wire 12 formed in a wave pattern and having a number of circumferential spring turns 13. Each spring turn has successive waves formed from distinct crest portions 14 and trough portions 15 which follow a substantially sinusoidal wavepath in a circular pattern around the longitudinal axis A of the spring 10. The crest portions 14 of one spring turn abuts the trough portions 15 of the spring turn lying adjacent to it either above or below it and hence the description, "crest-to-crest". The spring 10 illustrated has a operating length $L_L$ equal generally to the distance between the ends 16 of the spring 10. The thickness of each spring turn 13 consists of only the thickness of the single strip of wire which makes up the spring turn. Each spring turn is spaced apart from adjacent spring turns in the axial direction along the spring's longitudinal axis $L_A$.

The spring 10 is suitable for most applications. However, in certain applications, the loading condition to be experienced by the spring 10 may exceed the capacity of the spring 10. In order to provide a wave spring in this increased load application, and importantly where space is not a limiting factor, multiple springs 10 may be stacked end to end (so that the spring ends 16 abut each other) to meet the load requirements.

FIG. 2 illustrates another known prior art wave spring 20 which is particularly useful for retaining ring-type applications. The wave spring 20 is seen to consist of one or more adjacent flat wire turns 22 formed in define wave patterns having successive crest portions 23 and trough portions 24. The spring turns 22 of the spring lie parallel, or adjacent each other, that is, each successive 360° spring turn abuts the spring turn either above or below it. Although the spring 20 is able to support a larger relative load than the spring 10, primarily due to the increased thickness of its spring turns 22, the spring 20 does not possess the inherent flexibility of the crest-to-crest wave spring 10 because it lacks a crest-to-crest configuration.

The present invention is directed to a new and improved crest-to-crest wave spring which offers increased load carrying capacity, increased fatigue life and the spring flexibility normally found in crest-to-crest wave springs. FIG. 4 illustrates a wave spring 100 constructed in accordance with the principles of the present invention which provides the advantages of stacked crest-to-crest wave springs with increased load capacity by increasing the thickness of the spring turns, while maintaining the crest- to-crest configuration.

As illustrated in FIGS. 4–7, the spring 100 is an "interlaced", or "interwoven" wave spring. These terms are believed to be new in the art of springs and will refer to, in the context of this detailed discussion, crest-to-crest wave springs in which the spring turns have multiple, adjacent layers which are formed by combining two or more wave springs together. In one preferred embodiment of the present invention and as illustrated specifically in FIG. 4, the interlaced wave spring 100 comprises two constituent wave springs 100a, 100b which are interlaced together.

The constituent wave springs 100a, 100b are formed from respective flat wire strips 102a, 102b which are spirally wound around respective common edges 104a, 104b and about their respective spring longitudinal axes $L_1$, $L_2$ to form a series of spring turns 105a, 105b. A "spring turn", as utilized herein refers to a complete 360° of revolution around the spring longitudinal axis. For example, the spring illustrated in FIG. 1 has about five spring turns, the spring of FIG. 2 has about two spring turns and the springs of FIGS. 3–5 have about three turns. Each spring can be characterized as having an inner radius $R_{I-1}$, $R_{I-2}$ and an outer radius $R_{O-1}$, $R_{O-2}$ which define respective widths $W_1$-$W_2$ of the wire strips 102a, 102b taken radially from the longitudinal axes $L_1$, $L_2$ of the springs 102a, 102b, hereinafter referred to as the 'radial width' of the wire strips 102a, 102b.

Each spring 100a, 100b is further formed in a wave pattern which defines a wave path extending between the opposite ends 106a, 106b and 108a, 108b of the springs. This wavepath is preferably introduced during the winding of each spring 100a, 100b and includes a series of successive similar wave crests 110a, 110b and wave troughs 112a, 112b. Preferably, the wavepath of each spring 100a, 100b is continuous and sinusoidal in nature throughout its extent between the spring ends 106a, 106b and 108a, 108b.

Figure 8:
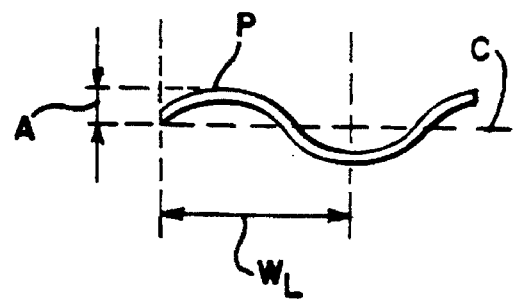
FIG. 8 is a diagrammatic view of a wave of a wave spring illustrating certain physical characteristics of the waves.

The waves of each spring 100a, 100b are formed at a particular amplitude ("A"), which as used herein and as illustrated in FIG. 8 refers to the distance from the centerline C of the spring turn to the peak P of either the wave crests 110a, 110b or wave troughs 112a, 112b. In most applications for wave springs of the present invention, this distance will be generally equal to one-half of the true height of any individual wave.

The waves of each spring 100a, 100b are further also formed at a particular frequency, which, as used herein, refers to the number of waves present in each spring turn 105a, 105b. Although the constituent wave springs 100a, 100b and interlaced wave springs 100 illustrated in the Figures and described herein have about three waves per turn, it will be understood that such is merely an illustration and the number of waves per turn will be limited only by material and space requirements.

In order to obtain the benefits and advantages of the present invention, it is preferred that the frequency and amplitudes of the waves of each of the constituent wave springs 100a, 100b are substantially equal so that when they are interlaced together as illustrated in FIG. 4, the resulting interlaced spring 100 presents and acts as an overall unitary structure. That is, the spring turns 105a, 105b of the constituent springs 100a, 100b should lie adjacent each other and substantially abut each other for the entire free length D (i.e. the length of the spring in an uncompressed state) of the interlaced wave spring 100. In other words, no significant gaps should occur between the interlaced constituent wave springs 100a, 100b because the two spring turns 105a, 105b are, in effect, "matched" for their entire lengths. By "significant" is meant no gaps which exceed 10% of the thickness of the wire which makes up the spring. This matching also ensures that the wave crest portions 110a, 110b and wave trough portions 112a, 112b are aligned together generally at their peaks, P, to form the unitary wave crest portions 110 and wave trough portions 112 of the interlaced wave spring 100.

Due to this interlacing, the thickness of each of the spring turns 105 of the interlaced wave spring 100 is effectively increased by the number N of constituent wave springs. In FIG. 4, this thickness is effectively doubled as a result of two wave springs interlaced together, while in FIG. 5, it is effectively quadrupled as a result of four wave springs interlaced together.

In effect, the present invention provides a way to obtain greater loads on an interlaced spring than on a single spring. The spring characteristics are affected in proportion to the number of interlacings or interwindings.

The following two tables represent the beneficial physical characteristics which are obtained from interlaced wave springs formed from constituent wave springs having 2.00 inch diameter, a material thickness of approximately 0.018 inch, a radial width of about 0.143 inch and about 3½ waves per spring turn. The data set forth in them demonstrate the theoretical effect of the spring interlacings on various physical characteristics of the interlaced spring.

TABLE 1

Theoretical Increase in Load Carrying Ability of Interlaced Spring While Maintaining Operating Stress Constant

| | Number of springs interlaced together (N) | | | |
|---|---|---|---|---|
| | N = 1(single spring) | N = 2 | N = 3 | N = 4 |
| Spring Deflection | 1.51 | 1.51 | 1.51 | 1.51 |
| Spring Load (lbs.) | 25 | 50 | 75 | 100 |
| Spring Rate (lbs/in.) | 16.5 | 33.1 | 49.7 | 66.2 |
| Operating Stress (lbs/in$^2$) | 255,262 | 255,262 | 255,262 | 255,262 |
| Theoretical Fatigue Life (Cycles) | <30,000 | <30,000 | <30,000 | <30,000 |

It can be seen from Table 1 that as the number of interlacings increase, the load capacity of the interlaced spring will increase by a factor of N, which is equal to the number of interlacings. Although the spring load is increased, the operating stress of the interlaced spring remains constant. Therefore, the use of two constituent wave springs permits the load on the spring to be doubled without any increase in operating stress, three constituent wave springs permits the load to be tripled and so on.

TABLE 2

Theoretical Decrease in Operating Stress of Interlaced Spring While Maintaining Load Constant

| | Number of springs interlaced to ther (N) | | | |
|---|---|---|---|---|
| | N = 1(single spring | N = 2 | N = 3 | N = 4 |
| Spring Deflection (in.) | 1.51 | .755 | .503 | .378 |
| Spring Load (lbs.) | 25 | 25 | 25 | 25 |
| Spring Rate (lbs/in.) | 16.5 | 33.1 | 49.7 | 66.1 |
| Operating Stress (lbs./in$^2$) | 255,262 | 127,631 | 85,087 | 63,815 |
| Theoretical Fatigue Life (Cycles) | 30,000 | 100,000–200,000 | 1,000,000+ | 1,000,000+ |

Table 2 demonstrates that when the load is maintained, as the number of constituent wave springs interlaced together increases, the spring deflection and operating stress will proportionally decrease by a factor of N, the number of constituent wave springs and the fatigue life of the interlaced spring increases.

Apart from wave frequency and amplitude, it is also desirable, but not required, that the constituent wave springs 100a, 100b share other equal physical characteristics, such as substantially equal radial widths, thicknesses and materials of construction. This overall equalness of structure of the constituent springs 100a, 100b assists the interlaced spring 100 in acting as a unitary structure. Equal thicknesses and radial widths $W_1$, $W_2$ of the constituent springs will assist in the assembly of the springs by the interlacing thereof which may be done either manually or by machines.

When the springs 100a, 100b have substantially equal radial widths, their inner and outer circumferential edges occurring at their associated inner and outer radii will be generally aligned together which will facilitate the application of the interlaced spring either within a recess or bore or on a shaft. This radial "matching" also assists in ensuring uniformity of loading on the spring 100, for if the wire strips 102a, 102b of the constituent springs do not match up in abutting engagement for the width and along their length, but rather are slightly displaced, such as in the case of where the peaks P of adjacent spring turn waves are slightly offset, the loading of the spring will not be entirely uniform during initial compressions of the interlaced wave spring until such time as the constituent wave springs move and align themselves together under loading. Additionally, where the radial matching is uniform, the factor N affecting the spring load and spring rate will be an integer such as shown in Tables 1 and 2 above.

Figure 7:
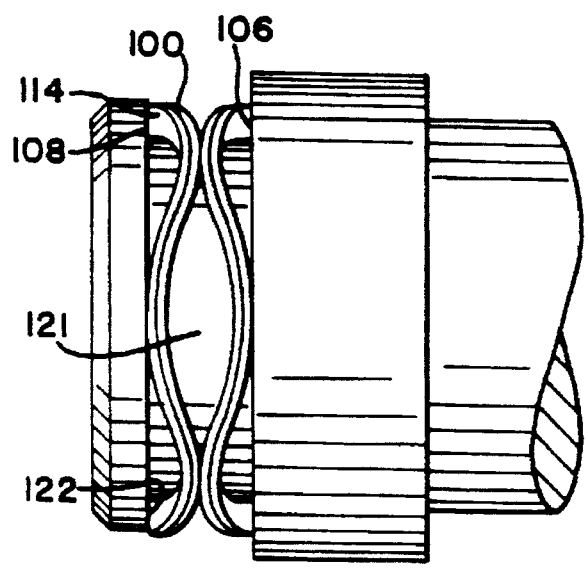
FIG. 7 is an elevational view of an interlaced crest-to-crest wave spring of the present invention in place on a shaft and serving as a retaining member to retain a workpiece in place on the shaft.

The successive wave crest and wave trough portions 110a, 110b and 112a, 112b of the constituent springs 100a, 100b may also include shoulder portions 114a, 114b defined thereon, primarily located around the crests, or peaks P of the waves. These shoulder portions 114a, 114b cooperate to provide workpiece engagement surfaces 114 at the opposing ends 106, 108 of the interlaced spring 100, which, as illustrated in FIGS. 6 and 7 engage a bore wall 120 shown in FIG. 6 or the groove wall 122 shown in FIG. 7.

The constituent springs 100a, 100b are preferably formed by edge winding which avoids any abrupt peaks or ridges which typically occur in die-stamped springs and washers and retaining rings. The wire strips 102a, 102b of the constituent wave springs 100a, 100b each have free ends 116, 118 which remain free after the constituent springs are interlaced so that the interlaced spring 100 may be circumferentially expanded or contacted to simplify its installation on shafts or in bores. These free ends 116a, 116b also facilitate the installation of the interlaced spring in some applications such as in the shaft application of FIG. 7 where the free ends of the interlaced spring may be inserted into a groove 121 and the remaining length of the spring 100 spiraled into the groove 121. The free ends 116a, 116b also facilitate interfacing the springs 100a, 100b together.

The free ends 116a, 116b of the constituent springs 100a, 100b are preferably located off of the peak of any crest portions 110a, 110b and preferably located on either the incline of a wave so as not to introduce an additional thickness to the shoulder portions 114 of the interlaced spring 100.

As for materials of construction, it is preferable that a metal flat wire be used in the forming of the constituent springs although it is contemplated that in some application high strength and/or reinforced plastics may be suitable for use. The spring wire strips may be produced from steel, copper and super alloys. Suitable carbon spring steels, may be used for normal applications, and stainless steel may be used in applications which require corrosion resistance. For nonmagnetic applications, copper; and particularly beryllium copper alloys, may be used as well as various bronzes, while high temperature applications may require the use of a super alloy such as Inconel or other nickel-chromium alloys.

FIG. 5 illustrates another embodiment of an interlaced wave spring 200 constructed in accordance with the principles of the present invention wherein the interlaced spring 200 is formed from four constituent wave springs 200a–d. It can be seen that the waves of each of the constituent wave springs are virtually identical so that they match up along their respective crest and trough portions.

It will be appreciated that the embodiments of the present invention that have been discussed herein are merely illustrative of a few applications of the principles of the invention. Numerous modifications may be made by those skilled in the art without departing from the true spirit and scope of the invention.

We claim:

1. In a crest-to-crest wave spring generally spirally wound around a longitudinal spring axis and having a plurality of spring turns including a plurality of successive waves in which the waves include alternating wave crest and wave trough portions, the improvement comprising: the spring being formed from at least first and second constituent crest-to-crest wave springs interlaced together, the first and second constituent wave springs each including first and second continuous flat wire strips generally spirally wound around respective first and second longitudinal axes of said first and second constituent wave springs, said first and second constituent wave springs each having a plurality of successive waves having alternating wave crest and wave trough portions, said first and second constituent wave springs being interlaced together along their respective spring lengths, whereby said first and second wave spring wave crest and wave trough portions lie adjacent each other and whereby said first and second flat wire strips substantially abut each other along substantially the entire spring lengths of said first and second constituent wave springs without any significant gap occurring between said adjacent first and second constituent wave springs, said first and second wave spring wire strips cooperating together to define spring turns within said wave spring of increased thickness.

2. The crest-to-crest wave spring as defined in claim 1, wherein said first and second flat wires are edgewound around said spring longitudinal axis.

3. The crest-to-crest wave spring as defined in claim 1, wherein said waves of said first and second constituent wave springs are formed with substantially equal amplitudes.

4. The crest-to-crest wave spring as defined in claim 1, wherein said waves are formed in said first and second constituent wave springs at substantially constant frequencies.

5. The crest-to-crest wave spring as defined in claim 1, wherein said waves are formed in said first and second constituent wave springs with substantially equal amplitudes and constant frequencies.

6. The crest-to-crest wave spring as defined in claim 5, wherein said first and second flat wire strips generally abut each other across their respective radial widths for the entirety of said first and second constituent wave spring lengths.

7. The crest-to-crest wave spring as defined in claim 1, wherein said first and second flat wire strips have substantially equal radial widths.

8. The crest-to-crest wave spring as defined in claim 7, wherein said first and second flat wire strips generally abut each other across their respective radial widths and for the entirety of their respective lengths.

9. The crest-to-crest wave spring as defined in claim 1, wherein said first and second constituent wave springs are formed from a metal chosen from the group consisting essentially of: carbon steels, stainless steels, copper alloys or nickel-chromium alloys.

10. The crest-to-crest wave spring as defined in claim 1, further including, additional constituent wave springs interlaced together with said first and second constituent wave springs said additional constituent wave springs cooperating with said first and second constituent wave springs to further increase said thickness of said wave spring spring turns.

11. The crest-to-crest wave spring as defined in claim 1, wherein each of said first and second constituent wave springs include free end portions.

12. The crest-to-crest wave spring as defined in claim 1, wherein said waves of each of said first and second constituent wave springs are formed in a continuous and generally sinusoidal pattern.

13. The crest-to-crest wave spring as defined in claim 1, wherein said first and second constituent crest-to-crest wave springs are formed from a plastic.

14. An interlaced compression wave spring comprising: at least first and second wave springs interlaced together, the first and second wave springs being formed from respective separate first and second elongated flat wire strips spirally wound around a common longitudinal axis to form first and second series of individual spring turns, each of the spring turns of said first and second series having a plurality of successive waves which define a continuous and generally sinusoidal wavepath extending between opposite ends of said interlaced wave spring, said waves including successive crest and trough portions extending along said wavepath, said first and second wire strips having said waves formed therein at substantially equal amplitudes and frequencies, whereby when said first and second wave springs are interlaced together, said first and second wire abut each other for substantially the entire length of said interlaced wave spring without any significant gaps occurring between said first and second wire turns.

15. An interlaced compression wave spring as claimed in claim 14, wherein said first and second wire strips have equal radial widths.

16. An interlaced compression wave spring as claimed in claim 14, wherein said wave crest and trough portions include shoulder portions disposed at said interlaced wave spring opposite ends which are adapted to abuttingly engage opposing work piece surfaces.

17. An interlaced compression wave spring as claimed in claim 14, wherein each of said first and second wire strips are of approximately equal lengths.

18. An interlaced compression wave spring as claimed in claim 14, wherein each of said first and second wire strips have respective spaced apart inner and outer circumferential edges, said inner and outer circumferential edges being generally aligned together for the length of said interlaced wave spring.

19. An interlaced compression wave spring as claimed in claim 14, wherein said wave crest and trough portions of said first and second wire strips are spaced equidistant from each other circumferentially along said first and second wave spring wavepaths.

20. An interlaced wave spring comprising: at least two separate crest-to-crest wave springs interlaced together, the two wave springs being formed from respective separate first and second elongated flat wire strips spirally wound around a common longitudinal axis to form first and second series of individual spring turns, each of the spring turns of said first and second series having a plurality of successive waves which define a continuous and generally sinusoidal wavepath extending between opposite ends of said interlaced wave spring, said waves including successive crest and trough portions extending along said wavepath, said first and second wire strips having said waves formed therein at substantially equal amplitudes and frequencies, said separate first and second wire strips having respective inner and outer circumferential edges that define a first radial width for said first wire strip and a second radial width for said second wire strip, said first and second radial widths being substantially uniform for the length of said interlaced wave spring whereby when said two wave springs are interlaced together, said first and second wire strips abut each other for substantially the entire length of said interlaced wave spring.

* * * * *